United States Patent
Zhang et al.

(10) Patent No.: US 11,729,849 B1
(45) Date of Patent: Aug. 15, 2023

(54) UE RETRY DURING NETWORK OVERLOAD

(71) Applicant: T-Mobile USA, Inc., Bellevue, WA (US)

(72) Inventors: Lin Zhang, Overland Park, KS (US); Syed Toaha Ahmad, Renton, WA (US); Jaime Enrique Rodriguez Villate, Seattle, WA (US); Hsin Fu Henry Chiang, Bellevue, WA (US); James J. Bae, Chantilly, VA (US); Adnan Rahat, Renton, WA (US); Hang Hoi Yau, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 22 days.

(21) Appl. No.: 17/381,028

(22) Filed: Jul. 20, 2021

(51) Int. Cl.
*H04W 76/18* (2018.01)
*H04W 28/12* (2009.01)
*H04W 28/02* (2009.01)

(52) U.S. Cl.
CPC ....... *H04W 76/18* (2018.02); *H04W 28/0289* (2013.01); *H04W 28/12* (2013.01)

(58) Field of Classification Search
CPC ..... H04W 76/18; H04W 76/19; H04W 76/10; H04W 28/0289; H04W 28/12; H04W 28/0247; H04W 28/02; H04W 28/0284; H04W 28/0835; H04W 48/02; H04W 48/08; H04W 48/06; H04W 72/005; H04W 74/002; H04W 74/006
See application file for complete search history.

(56) References Cited

U.S. PATENT DOCUMENTS

| | | | | |
|---|---|---|---|---|
| 8,699,464 | B1 * | 4/2014 | Vivanco | H04W 48/18 370/331 |
| 2014/0106699 | A1 * | 4/2014 | Chitre | H04W 76/25 455/404.1 |
| 2019/0045524 | A1 * | 2/2019 | Pettersson | H04W 28/0278 |
| 2019/0306787 | A1 * | 10/2019 | Pasupuleti | H04W 52/0209 |
| 2020/0260496 | A1 * | 8/2020 | Jin | H04W 74/0833 |
| 2021/0136582 | A1 * | 5/2021 | Liu | H04W 12/06 |
| 2021/0227455 | A1 * | 7/2021 | Aramoto | H04W 48/18 |
| 2021/0410096 | A1 * | 12/2021 | You | H04W 60/04 |
| 2022/0287099 | A1 * | 9/2022 | Alba | H04W 52/0209 |

FOREIGN PATENT DOCUMENTS

WO WO-2015039281 A1 * 3/2015 .......... H04W 76/027

* cited by examiner

*Primary Examiner* — Sudesh M Patidar
(74) *Attorney, Agent, or Firm* — Barta, Jones & Foley, PLLC

(57) ABSTRACT

A solution for handling network congestion includes: attempting, by a user equipment (UE), to initiate a data session (e.g., a voice over WiFi (VoWiFi) call) over a packet data network (PDN); receiving, by the UE, a notification of network congestion; based on at least a fast retry timer and a fast retry counter, attempting, by the UE, fast retries up to a maximum number of fast retries at a fast retry time interval; and based on at least none of the initial attempt and the fast retries initiating the data session, attempting, by the UE, slow retries at a slow retry time interval until the data session is initiated or a trigger condition halts the slow retries. In some examples, the UE receives a retry parameter set from the network including the maximum number of fast retries, the fast retry time interval, and the slow retry time interval.

17 Claims, 5 Drawing Sheets

UE RETRY DURING NETWORK OVERLOAD

BACKGROUND

Some cellular telephones, known as user equipment (UE), are able to place voice calls over WiFi through the internet, which is an example of a packet data network (PDN). These are commonly identified as voice over WiFi (VoWiFi) calls, to differentiate from calls placed over cellular networks, such as voice over new radio (VoNR) and voice over long term evolution (VoLTE). VoWiFi may be either managed by a cellular carrier (e.g., passing through at least a portion of the cellular carrier's network) or unmanaged (e.g., not passing through a cellular carrier's network). VoWiFi may be used, for example, when a cellular call, such as VoNR or VoLTE is not available. Managed VoWiFi calls may pass through an evolved packet data gateway (ePDG) or a non-3GPP interworking functions (N3IWF) in a wireless network (e.g., the cellular carrier's network).

UEs are typically programmed to automatically retry certain types of connections, such as voice calls, when initial setup attempts fail. Such programming may be determined by the UE's manufacturer or provider. Different UEs may thus have different degrees of retry aggressiveness, with some UEs retrying failed voice calls at a more rapid pace than others. When there is a condition that results in network congestion, UEs with an aggressive retry profile may overwhelm the network with a high number of setup requests, worsening network congestion.

SUMMARY

The following summary is provided to illustrate examples disclosed herein, but is not meant to limit all examples to any particular configuration or sequence of operations.

A solution for handling network congestion includes: attempting, by a user equipment (UE), to initiate packet data network (PDN) connectivity (e.g., internet protocol (IP) multimedia system (IMS) PDN connectivity for a voice over WiFi (VoWiFi) call) over a Wi-Fi network (e.g., initiate a data session over a PDN); receiving, by the UE, a notification of network congestion; based on at least a fast retry timer and a fast retry counter, attempting, by the UE, fast retries up to a maximum number of fast retries at a fast retry time interval; and based on at least none of the initial attempt and the fast retries initiating the data session, attempting, by the UE, slow retries at a slow retry time interval, longer than the fast retry time interval, until the data session is initiated or a trigger condition halts the slow retries. In some examples, the UE receives a retry parameter set from the network including the maximum number of fast retries, the fast retry time interval, and the slow retry time interval.

BRIEF DESCRIPTION OF THE DRAWINGS

The disclosed examples are described below with reference to the accompanying drawing figures listed below, wherein.

Figure 1:
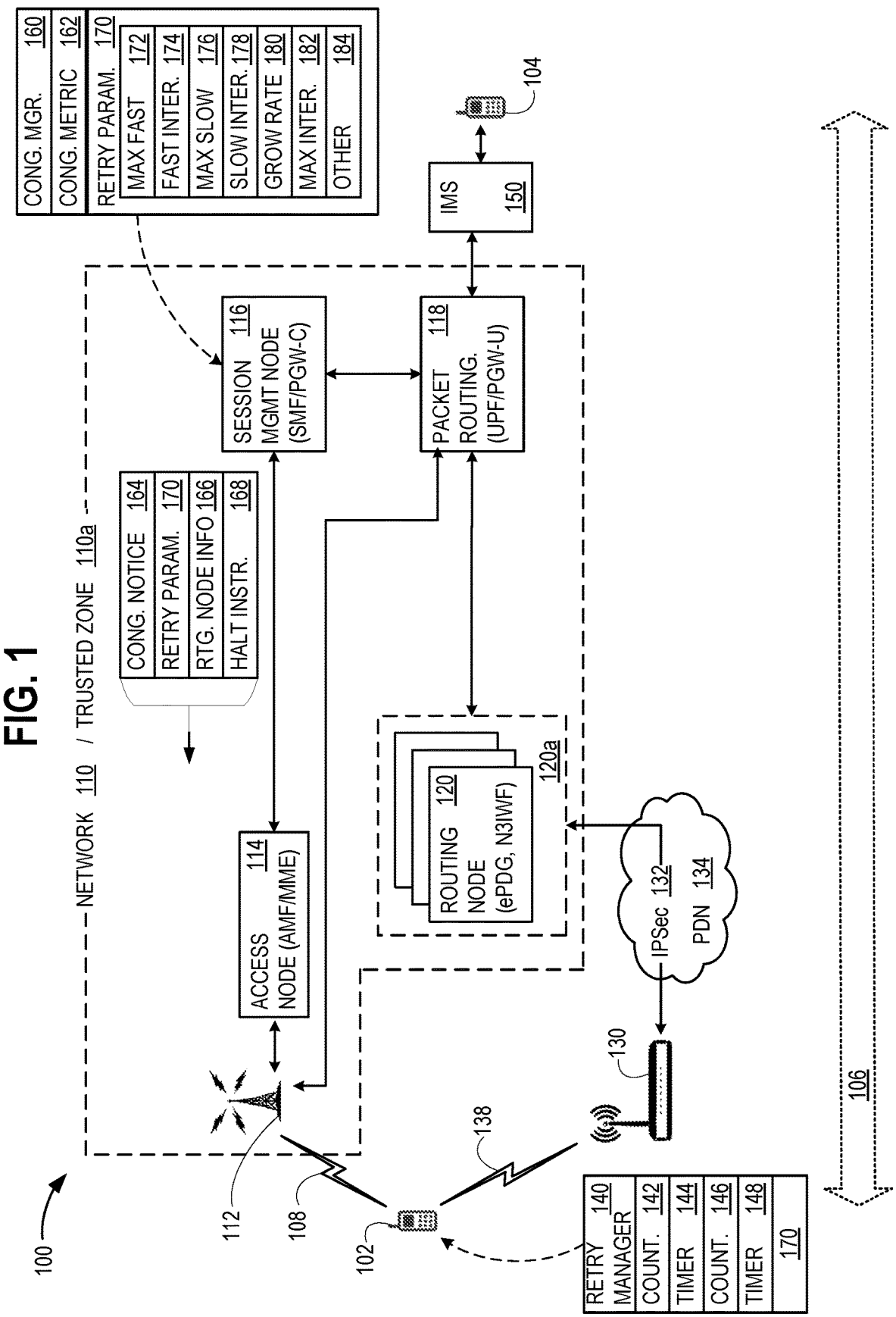
FIG. 1 illustrates an exemplary arrangement that intelligently manages user equipment (UE) retries during network congestion conditions that may lead to network overload.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for handling network congestion includes attempting, by a user equipment (UE), to initiate packet data network (PDN) connectivity (e.g., internet protocol (IP) multimedia system (IMS) PDN connectivity for a voice over WiFi (VoWiFi) call) over Wi-Fi network (e.g., initiate a data session over a PDN; receiving, by the UE, a notification of network congestion; based on at least a fast retry timer and a fast retry counter, attempting, by the UE, fast retries up to a maximum number of fast retries at a fast retry time interval; and based on at least none of the initial attempt and the fast retries initiating the data session, attempting, by the UE, slow retries at a slow retry time interval, longer than the fast retry time interval, until the data session is initiated or a trigger condition halts the slow retries. In some examples, the UE receives a retry parameter set from the network including the maximum number of fast retries, the fast retry time interval, and the slow retry time interval.

Another solution for handling network congestion includes detecting, by a wireless network, a network congestion condition; detecting, by the wireless network, a failed attempt, by a UE, to initiate a data session over a PDN through the wireless network; transmitting, by the wireless network, to the UE, a notification of network congestion; and transmitting, by the wireless network, to the UE, a retry parameter set including a maximum number of fast retries, a fast retry time interval, and a slow retry time interval. In some examples, the retry parameter set further includes a rate at which the slow retry time interval increases with a value of a slow retry counter, and/or a maximum number of slow retries. In some examples, the retry scheme varies based on the severity of the congestion and/or roaming conditions.

Aspects of the disclosure improve the efficiency and throughput of wireless communication by throttling call setup retries during network congestion conditions, thereby precluding or reducing a potential cascading effect of UEs retrying call setups at an overly-aggressive rate. For example, aspects of the disclosure include a UE performing fast retries at a fast retry time interval and then, if the fast retries fail, shifting to slow retries at a longer slow retry time interval—thereby throttling the retries. As another example, aspects of the disclosure include transmitting to a UE a retry parameter set including a maximum number of fast retries, a fast retry time interval, and a slow retry time interval—thereby enabling the network to specify the retry throttling scheme. These aspects reduce, for example, burdens on evolved packet data gateways (ePDGs) or non-3GPP interworking functions (N3IWFs) that handle managed VoWiFi calls. Collectively ePDGs and N3IWFs are referred to herein as routing nodes.

The cellular network is thus able to advantageously control UE behavior to reduce network congestion, in some examples. This provides flexibility for handling network congestion or overloads of varying degrees of severity. Fast retries may occur at intervals on the order of single-digit seconds or fractions of a second, whereas slow retries may occur at intervals on the order of tens of seconds or even minutes. In some examples, the slow retry time interval may increase up to some maximum interval. During the retry over Wi-Fi, if a cellular network (5G, 4G, or another) is available, the UE performs cellular domain selection, and so may be able to make calls and send/receive SMS on cellular. If the cellular network is also congested, retries of cellular calls, such as voice over new radio (VoNR) and voice over long term evolution (VoLTE) may occur in parallel. In some examples, retries halt (cease) when the radio access network selection logic in the UE decides to abandon setup of the PDN connection over WiFi (e.g., Wi-Fi signal strength no longer meets the minimum acceptable threshold). In some examples, the cellular network sends an instruction to the UE to halt retries. In some examples, the UE halts slow retries after reaching a maximum number or a maximum time (which is equivalent to a maximum number when the retry time interval is specified). In some examples, the UE continues deriving the next routing node's IP address and continues retries even after reaching specified maximum number.

In some examples, fast retries cycle through different routing nodes, starting with a preferred routing node and then attempting call setup through other routing nodes before returning to the preferred routing node. In some examples, the slow retries use the same cycling order through routing nodes. In some examples, the network provides a list of internet protocol (IP) addresses for routing nodes and/or the cycling order. In some examples, the retry scheme is turned off or is tailored for roaming scenarios, such as a cellular carrier's subscriber UE on another network or a guest UE that is another cellular carrier's subscriber. In some examples, the retry scheme is tailored to the severity of the network congestion condition by the network sending a specific retry parameter set that is appropriate for the severity of the network congestion condition.

With reference now to the figures, FIG. 1 illustrates an arrangement 100 that intelligently manages VoWiFi calls for UE 102 over a wireless network 110. Wireless network 110 supports cellular calls, such as VoNR using fifth generation (5G) cellular technology and VoLTE using fourth generation (4G) cellular technology, in addition to managed VoWiFi calls through a routing node 120. In some examples routing node 120 comprises a routing node. In some examples routing node 120 comprises an N3IWF. In FIG. 1 UE 102 is attempting to initiate a data session 106 as a voice call to another UE 104, which may be VoWiFi or a cellular call.

A cellular voice call (e.g., VoNR, VoLTE, or another type) will pass from UE 102 over an air interface 108 to a radio access network (RAN) 112 in wireless network 110, through a packet routing node 118 (also within wireless network 110), and then to an IP multimedia system (IMS) 150 in order to reach UE 104. Signaling for a cellular call passes from RAN 112 to an access node 114 and a session management node 116. For 5G, access node 114 may comprise an access and mobility function (AMF), session management node 116 may comprise a session management function, and packet routing node 118 may comprise a user plane function (UPF). For 4G, access node 114 may comprise a mobility management entity (MME), session management node 116 may comprise a packet data network gateway (PGW)—control plane (PGW-C), and packet routing node 118 may comprise a PGW—user plane (PGW-U). UE 102 authenticates itself to RAN 112. Because RAN 112, access node 114, session management node 116, and packet routing node 118 are all under the control of the cellular carrier that operates wireless network 110, they are within a trusted network zone 110a.

A managed VoWiFi call will pass from UE 102 over an air interface 138 to a WiFi router 130, through a PDN 134 using an IP security (IPSec) tunnel 132 to routing node 120 (or another routing node within routing node set 120a, which includes multiple routing nodes) within wireless network 110. PDN 134 may be the internet, and may be an example of a network 660, which is described in further detail in relation to FIG. 6. From routing node 120, a VoWiFi call will then pass through packet routing node 118 to IMS 150 in order to reach UE 104. Because routing node set 120a is within wireless network 110 and managed by the cellular carrier, routing node set 120a is also within a trusted network zone 110a. However, WiFi router 130 may not be managed by the cellular carrier or be within wireless network 110. Therefore, UE 102 may be attempting to access resources within wireless network 110 from an untrusted zone (e.g., air interface 138).

An internet key exchange (IKE) protocol may be used for setting up a trusted connection, so that wireless network 110 accepts traffic from PDN 134. For example, UE 102 may attempt to initiate data session 106 using an IKE_SA_INIT message (or IKEv2_SA_INIT message), which initiates a security association (SA) in IPSec protocol and sets up a secure channel (e.g., IPSec tunnel 132).

When an initial call setup attempt fails, and UE 102 retries call setup, the throttling of the retries is managed by a retry manager 140 in UE 102 and/or a congestion manager 160 located somewhere within wireless network 110. In FIG. 1 congestion manager 160 is illustrated as residing within session management node 116, although it may be located elsewhere or even dispersed among multiple locations within wireless network 110. Further description of FIG. 1, including the operation of arrangement 100 is provided in the descriptions of the flowcharts of FIGS. 2-5.

Figure 2:
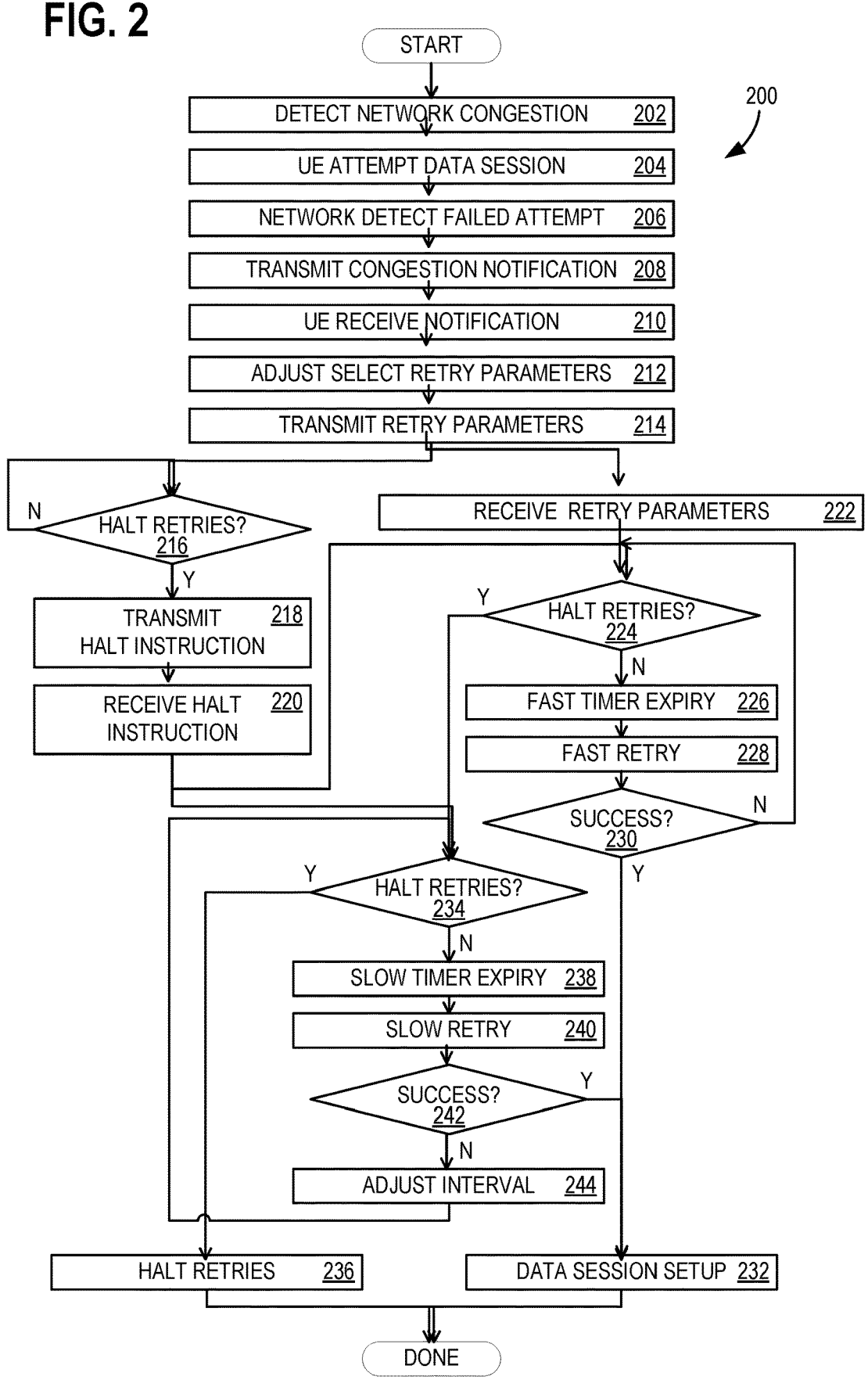
FIG. 2 illustrates a flowchart of exemplary interactions between the UE and a wireless network for managing UE retries in the arrangement of FIG. 1.

FIG. 2 illustrates a flowchart 200 of exemplary interactions between UE 102 and wireless network 110, and may occur in parallel with retries of cellular voice calls. In some examples, at least a portion of flowchart 200 may be performed using one or more computing devices 600 of FIG. 6. Flowchart 200 commences with operation 202, which includes detecting, by wireless network 110, a network congestion condition. In some examples, detecting the network congestion condition comprises detecting a congestion condition for routing node 120 or another routing node within routing node set 120a. In some examples a congestion metric 162 is used, and a congestion condition is determined by congestion metric 162 indicating congestion at or above some severity threshold.

Operation 204 includes attempting, by UE 102, to initiate data session 106 over PDN 134. In some examples, data session 106 comprises a VoWiFi call or another voice call. In some examples, the attempt to initiate data session 106 comprises an attempt to establish IPsec tunnel 132. In some examples, the attempt to initiate data session 106 uses an IKE_SA_INIT message. Operation 206 includes detecting, by wireless network 110, a failed attempt, by UE 102, to initiate data session 106 over PDN 134 through wireless network 110. In some examples, detecting the failed attempt comprises detecting the attempt to establish IPsec tunnel 132.

Operation 208 includes transmitting, by wireless network 110, to UE 102, a notification of network congestion (e.g., congestion notification 164 of FIG. 1). In some examples, congestion notification 164 comprises a private notify message. Some cellular standards, such as ETSI TS 124 502 and 3GPP 24.502 ("Access to the 3GPP 5G Core Network (5GCN) via non-3GPP access networks") identify private notify message error types, for example in section 9.2.4.2 of some versions. A private notify message error type with a decimal value of 15500 is indicated as a congestion message (although not previously used for routing nodes), although a range of 15501-15599 is available for use. In some examples, the private notify message error type comprises a value of 15500. In some examples, the private notify message error type comprises a value between 15500 and 15599, inclusive. In some examples, operation 208 comprises, based on at least detecting the attempt to establish IPsec tunnel 132 and detecting the congestion condition for routing node 120 (or another routing node), transmitting, to UE 102, the private notify message (as congestion notification 164). Operation 210 includes receiving, by UE 102, congestion notification 164. In some examples, one of routing node set 120a transmits congestion notification 164 to UE 102.

As illustrated, session management node 116 holds a retry parameter set 170 that includes multiple values, including a maximum number of fast retries 172, a fast retry time interval 174, a maximum number of slow retries 176, a slow retry time interval 178 (e.g., initially a starting value), a rate 180 at which slow retry time interval 178 increases (when stored in UE 102) with the value of a slow retry counter 146 (in UE 102), and a maximum slow retry time interval 182. In some examples, other value 184 may act as a turn off flag for UE roaming scenarios or a flag to prioritize the use of a routing node in a home or roaming network.

Operation 212 includes, based on a severity of the network congestion condition (e.g., as indicated by congestion metric 162), adjusting retry parameter set 170 or selecting a pre-configured version of retry parameter set 170. In some examples, operation 212 includes, based on at least congestion metric 162 indicating a first congestion severity, setting at least one parameter in retry parameter set 170 to a first value. In some examples, operation 212 includes, based on at least congestion metric 162 indicating a second congestion severity different than the first congestion severity, setting the at least one parameter in retry parameter set 170 to a second value different than the first value. For example, for worse congestion conditions, maximum number of fast retries 172 may be set to a lower value, fast retry time interval 174 may be set to a higher value, maximum number of slow retries 176 may be set to a lower value, slow retry time interval 178 may be set to a higher value, and/or rate 180 may be set to a higher value.

In some examples, congestion notification 164 indicates the severity of the network condition to UE 102. This may occur if retry manager 140 in UE adjusts retry parameter set 170 on its own in response to an indicated network congestion severity. In some examples, operation 208, described above, also includes, based on at least congestion metric 162 for routing node 120 (or another routing node) indicating the first congestion severity, setting the private notify message error type to the first value. In some examples, operation 208, described above, also includes, based on at least the congestion metric for routing node 120 indicating the second congestion severity different than the first congestion severity, setting the private notify message error type to the second value different than the first value.

Operation 214 includes transmitting, by wireless network 110, to UE 102, retry parameter set 170. In some examples, operation 214 also includes transmitting routing node information 166 to UE 102, where routing node information 166 may include IP addresses for routing nodes within routing node set 120a, along with a prioritization order in which UE 102 should select a routing node for various retries, so that UE 102 is not constantly trying only a single routing node. As indicated, flowchart 200 splits into parallel paths: operations 216-220 and operations 222-234.

In decision operation 216 wireless network 110 (e.g., session management node 116) determines whether to instruct UE 102 to halt retries. This may occur if network congestion has worsened, or for other reasons. Decision operation 216 loops until a determination is made to instruct UE 102 to halt retries. Operation 218 includes transmitting, by wireless network 110, to UE 102, an instruction to halt retries (e.g., halt instruction 168). UE 102 receives halt instruction 168 in operation 220. Halt instruction 168 is processed in either decision operation 224 or decision operation 234, as described below.

Operation 222 includes receiving, by UE 102, retry parameter set 170, which had been transmitted in operation 214. UE 102 has its own copy of retry parameter set 170, along with a fast retry counter 142, a fast retry timer 144, a slow retry counter 146, and a slow retry timer 148. Decision operation 224 includes UE 102 determining whether to halt fast retries. This may occur if fast retry counter 142 reaches maximum number of fast retries 172, UE 102 received halt instruction 168, or a cellular call (e.g., VoNR or VoLTE) has connected. If fast retries are halted, flowchart 200 moves to slow retry operations, starting with decision operation 234.

Otherwise, operation 226 waits for fast retry timer 144 to expire (e.g., by reaching fast retry time interval 174). Operation 228 increments fast retry counter 142 and also includes, based on at least fast retry timer 144 and fast retry counter 142, attempting, by UE 102, fast retries up to maximum number of fast retries 172 at fast retry time interval 174. In some examples, UE 102 cycles through routing node set 120a in an order indicated by wireless network 110. Decision operation 230 determines whether the latest retry was successful at initiating data session 106. If so, flowchart 200 moves to operation 232 to set up data session 106 and begin the voice call. Otherwise, flowchart 200 returns to decision operation 224.

When flowchart 200 moves to slow retries, decision operation 234 includes UE 102 determining whether to halt slow retries. This may occur if slow retry counter 146 reaches maximum number of slow retries 176, UE 102 received halt instruction 168, or a cellular call (e.g., VoNR or VoLTE) has connected. If slow retries are halted, flowchart 200 moves to operation 236 that halts all retries, and flowchart 200 terminates.

Otherwise, operation 238 waits for slow retry timer 148 to expire (e.g., by reaching slow retry time interval 178). Operation 240 increments slow retry counter 146 and also includes, based on at least none of the initial attempt and the fast retries initiating data session 106, attempting, by UE 102, slow retries at slow retry time interval 178 (which is longer than fast retry time interval 174) until data session 106 is initiated or a trigger condition halts the slow retries. In some examples, UE 102 cycles through routing node set 120a in an order indicated by wireless network 110. The trigger condition may be slow retry counter 146 reaching maximum number of slow retries 176, UE 102 receiving halt instruction 168, or a cellular call connecting.

Decision operation 242 determines whether the latest retry was successful at initiating data session 106. If so, flowchart 200 moves to operation 232 to set up data session 106 and begin the voice call. Otherwise, operation 244 increases slow retry time interval 178 based on at least a value of slow retry counter 146 up to maximum slow retry time interval 182. This may occur by increasing slow retry time interval 178 according to rate 180. For example, slow retry time interval 178 may start at 5 minutes, and increase by a fixed amount (e.g., adding 5 minutes for each retry), a fixed percentage (e.g., doubling), or some other growth profile. In some examples, slow retry time interval 178 is capped at maximum slow retry time interval 182 and does not grow beyond that. Flowchart 200 returns to decision operation 234. It should be understood that capping a maximum time for retries is equivalent to capping a maximum number of retries when the retry time interval is specified.

It should be understood that variations may produce equivalent operations. For example, using a maximum number of fast retries and maximum number of total retries (both fast and slow) is equivalent to using a maximum number of fast retries and a maximum number of slow retries, because the numbers have a fixed mathematical relationship. Additionally, specifying a maximum number of tries is equivalent to specifying a maximum number of retries, because tries is merely retries plus one. Further, specifying a maximum time is equivalent to specifying a maximum count and time intervals, because the maximum count and time intervals calculates to the maximum time. In general, a different set of parameters that have fixed relationships to parameters identified herein should be considered to be equivalent.

Figure 3:
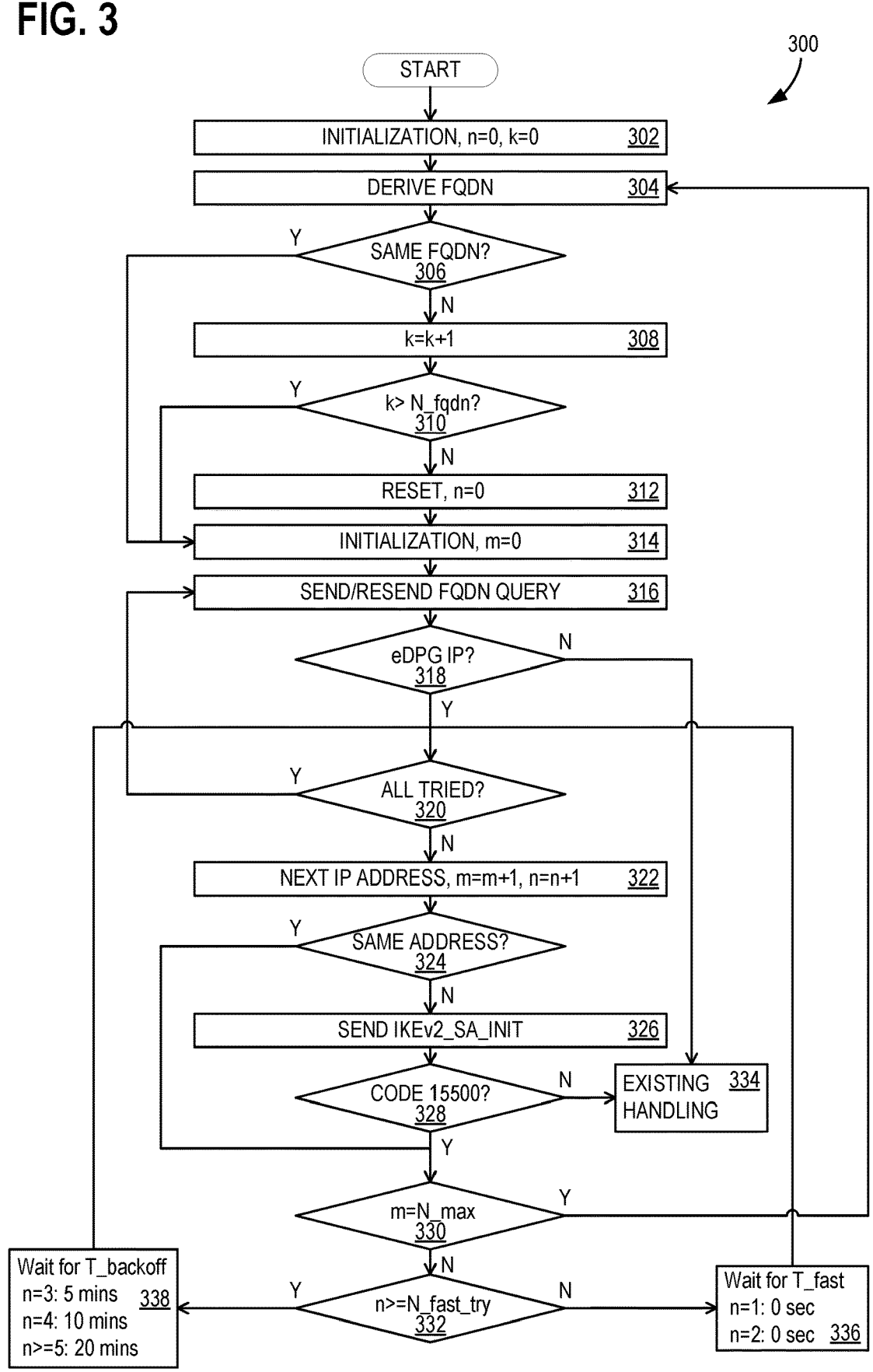
FIG. 3 illustrates a flowchart of exemplary retry operations by the UE in the arrangement of FIG. 1.

FIG. 3 illustrates a flowchart 300 of exemplary retry operations by UE 102. In some examples, at least a portion of flowchart 300 may be performed using one or more computing devices 600 of FIG. 6. Flowchart 300 commences with operation 302 that initializes variables n and k to 0. Variable n is the cumulative number of attach attempts or tries by UE 102 with all routing nodes. The number of retries is then n−1. Variable k is the sequence number of the current routing node, for example, in the cycle order indicated by wireless network 110. The fully qualified domain name (FQDN), which is the full IP address of a routing node, is derived in operation 304. In some examples, the home FQDN (HFQDN) is prioritized. Decision operation 306 determines whether the FQDN derived in operation 304 is the same as the prior FQDN that had just been tried. If so, flowchart 300 advances to operation 314. Otherwise, operation k is incremented in operation 308. Decision operation 310 determines whether k exceeds the total number of available FQDNs. If so, flowchart 300 advances to operation 314. Otherwise, n is reset to 0 in operation 312.

Operation 314 initializes variable m to 0. Variable m is the sequence number of routing node attach attempts for a specific FQDN. In operation 316, UE sends (or resends) an FQDN query to wireless network 110 to request identification of IP addresses of available routing nodes. A domain name server (DNS) may return multiple routing node IP addresses in a single routing node FQDN query response message, and UE 102 should be configured to traverse all the returned IP addresses. However, if none are returned, as determined in decision operation 318, flowchart 300 moves to operation 334 for existing handling solutions. Otherwise, flowchart moves to decision operation 320 to determine whether all returned IP addresses (for routing nodes) have been tried. If so, flowchart 300 returns to operation 316.

Otherwise, operation 322 prepares to try the routing node at the next IP address, and variables m and n are incremented.

Decision operation 324 determines whether the IP address is the same as the prior IP address that had been tried (e.g., the same routing node). If so, flowchart 300 advances to decision operation 330. Otherwise, UE 102 sends an IKEv2_SA_INIT message in operation 326. If an error code 15500 (a private notify message error type) is received, as determined in decision operation 328, flowchart 300 advances to decision operation 330. Otherwise, flowchart 300 moves to operation 334 for existing handling solutions.

Decision operation 330 determines whether m exceeds the maximum number of attach attempts for a specific FQDN. If so, flowchart 300 returns to operation 304 to derive another FQDN. Otherwise, decision operation 332 determines whether n meets or exceeds the maximum number of fast tries (e.g., maximum number of fast retries 172). To avoid getting the same cached routing node IP address before the time-to-live (TTL) expires, there will be multiple (e.g., three) IP addresses in each FQDN query response message (see operations 316 and 318 above). This provides UE 102 with a sufficient number of IP addresses for fast retries until TTL expires.

If n does not meet or exceeds the maximum number of fast tries, operation 336 waits for T_fast (fast retry timer 144) to reach the specified delay. As indicated, 0 second retry interval is used for the first two retries. This effectively means UE 102 retries immediately after a failure. After operation 336, flowchart 300 returns to decision operation 320. Otherwise, if n does meets or exceeds the maximum number of fast tries, operation 338 waits for T_backoff (slow retry timer 148) to reach the specified delay. As indicated, the retry intervals are 5 minutes, then 10 minutes, then 20 minutes thereafter. After operation 338, flowchart 300 returns to decision operation 320.

Figure 4:
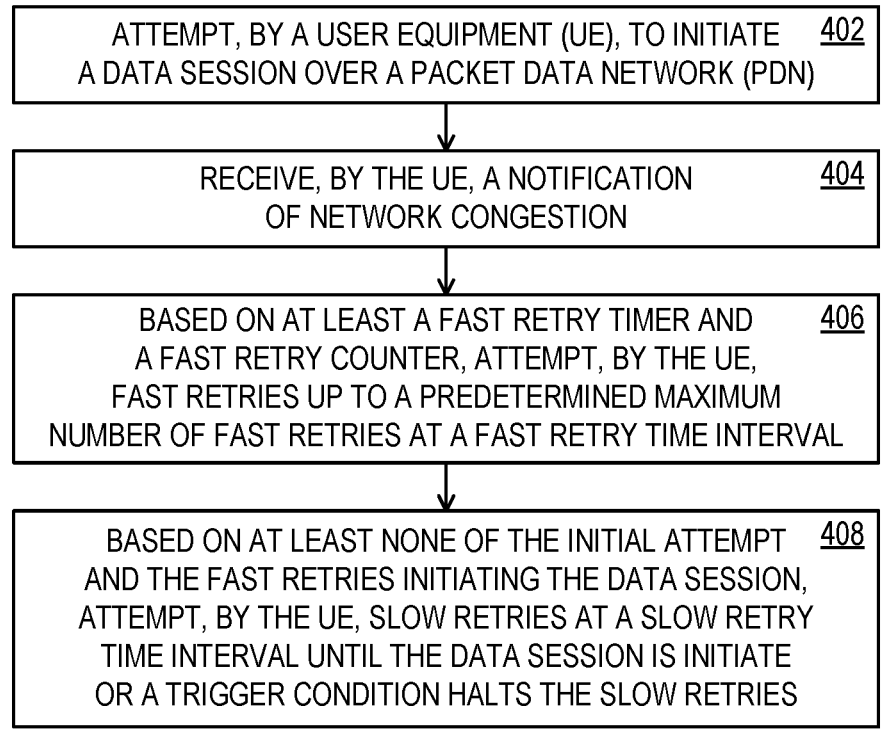
FIG. 4 illustrates another flowchart of exemplary operations for managing UE retries in the arrangement of FIG. 1.

FIG. 4 illustrates a flowchart 400 of exemplary operations associated with examples of arrangement 100. In some examples, at least a portion of flowchart 400 may be performed using one or more computing devices 600 of FIG. 6. Flowchart 400 commences with operation 402, which includes attempting, by a UE, to initiate a data session over a PDN. Operation 404 includes receiving, by the UE, a notification of network congestion. Operation 406 includes, based on at least a fast retry timer and a fast retry counter, attempting, by the UE, fast retries up to a maximum number of fast retries at a fast retry time interval. Operation 408 includes, based on at least none of the initial attempt and the fast retries initiating the data session, attempting, by the UE, slow retries at a slow retry time interval, longer than the fast retry time interval, until the data session is initiated, or a trigger condition halts the slow retries.

Figure 5:
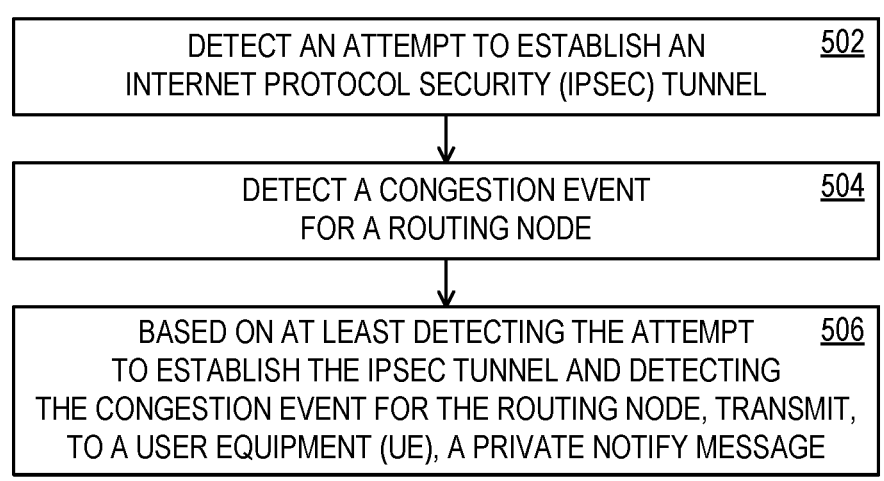
FIG. 5 illustrates another flowchart of exemplary operations for managing UE retries in the arrangement of FIG. 1.

FIG. 5 illustrates a flowchart 500 of exemplary operations associated with examples of arrangement 100. In some examples, at least a portion of flowchart 500 may be performed using one or more computing devices 600 of FIG. 6. Flowchart 500 commences with operation 502, which includes detecting an attempt to establish an IPsec tunnel. Operation 504 includes detecting a congestion condition for a routing node. Operation 506 includes, based on at least detecting the attempt to establish the IPsec tunnel and detecting the congestion condition for the routing node, transmitting, to a UE, a private notify message.

Figure 6:
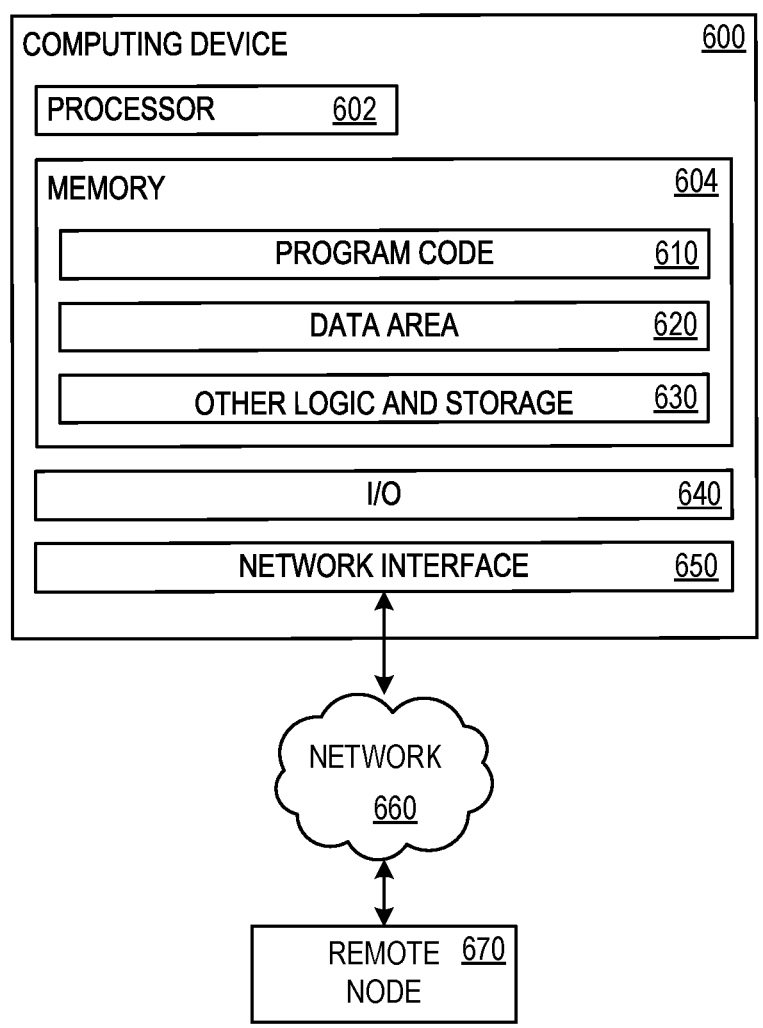
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600. For example, a remote node 670 may represent another of the above-noted nodes within arrangement 100.

Additional Examples

An example method of wireless communication comprises: attempting, by a UE, to initiate a data session over a PDN; receiving, by the UE, a notification of network congestion; based on at least a fast retry timer and a fast retry counter, attempting, by the UE, fast retries up to a maximum number of fast retries at a fast retry time interval; and based on at least none of the initial attempt and the fast retries initiating the data session, attempting, by the UE, slow retries at a slow retry time interval, longer than the fast retry time interval, until the data session is initiated or a trigger condition halts the slow retries.

An example system for wireless communication comprises: a processor; and a computer-readable medium storing instructions that are operative upon execution by the processor to: attempt, by a UE, to initiate a data session over a PDN; receive, by the UE, a notification of network congestion; based on at least a fast retry timer and a fast retry counter, attempt, by the UE, fast retries up to a maximum number of fast retries at a fast retry time interval; and based on at least none of the initial attempt and the fast retries initiating the data session, attempt, by the UE, slow retries at a slow retry time interval, longer than the fast retry time interval, until the data session is initiated or a trigger condition halts the slow retries.

One or more example computer storage devices has computer-executable instructions stored thereon, which, upon execution by a computer, cause the computer to perform operations comprising: attempting, by a UE, to initiate a data session over a PDN; receiving, by the UE, a notification of network congestion; based on at least a fast retry timer and a fast retry counter, attempting, by the UE, fast retries up to a maximum number of fast retries at a fast retry time interval; and based on at least none of the initial attempt and the fast retries initiating the data session, attempting, by the UE, slow retries at a slow retry time interval, longer than the fast retry time interval, until the data session is initiated or a trigger condition halts the slow retries.

Alternatively, or in addition to the other examples described herein, examples include any combination of the following:
the data session comprises a VoWiFi call;
the data session comprises a voice call;
receiving, by the UE, a retry parameter set including the maximum number of fast retries, the fast retry time interval, and the slow retry time interval;
the retry parameter set further includes a maximum number of slow retries;
the retry parameter set further includes a rate at which the slow retry time interval increases with a value of a slow retry counter, and the maximum slow retry time interval;
the slow retry time interval increases based on at least a value of a slow retry counter up to a maximum retry time interval;
the trigger condition comprises reaching a maximum number of slow retries or receiving an instruction to halt retries;
the notification of network congestion comprises a private notify message;
a private notify message error type comprises a value between 15500 and 15599, inclusive;
the private notify message error type comprises a value of 15500; and
the attempt to establish the IPsec tunnel comprises an attempt to establish a VoWiFi call.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:
attempting, by a user equipment (UE), to initiate a data session over a packet data network (PDN);
receiving, by the UE, a notification of network congestion comprising a congestion metric;
receiving, by the UE, a retry parameter set, the retry parameter set comprising a maximum number of fast retries, a fast retry time interval, and a slow retry time interval;
adjusting, by the UE, at least one parameter of the retry parameter set based on the congestion metric;
based on at least a fast retry timer and a fast retry counter, attempting, by the UE, fast retries up to the maximum number of fast retries at the fast retry time interval; and based on at least none of the initial attempt and the fast retries initiating the data session, attempting, by the UE, slow retries at the slow retry time interval, longer than the fast retry time interval, until the data session is initiated or a trigger condition halts the slow retries.

2. The method of claim 1, wherein the data session comprises a voice over WiFi (VoWiFi) call.

3. The method of claim 1, wherein the retry parameter set further includes a rate at which the slow retry time interval increases with a value of a slow retry counter, and a maximum slow retry time interval.

4. The method of claim 1, wherein the slow retry time interval increases based on at least a value of a slow retry counter up to a maximum slow retry time interval.

5. The method of claim 1, wherein the trigger condition comprises reaching a maximum number of slow retries or receiving an instruction to halt retries.

6. The method of claim 1, wherein the notification of network congestion comprises a private notify message.

7. A system for wireless communication, the system comprising:
a processor; and
a computer-readable medium storing instructions that are operative upon execution by the processor to:
attempt, by a user equipment (UE), to initiate a data session over a packet data network (PDN);
receive, by the UE, a notification of network congestion comprising a congestion metric;
receive, by the UE, a retry parameter set, the retry parameter set comprising a maximum number of fast retries, a fast retry time interval, and a slow retry time interval;
adjust, by the UE, at least one parameter of the retry parameter set based on the congestion metric;
based on at least a fast retry timer and a fast retry counter, attempt, by the UE, fast retries up to the maximum number of fast retries at the fast retry time interval; and
based on at least none of the initial attempt and the fast retries initiating the data session, attempt, by the UE, slow retries at the slow retry time interval, longer than the fast retry time interval, until the data session is initiated or a trigger condition halts the slow retries.

8. The system of claim 7, wherein the data session comprises a voice over WiFi (VoWiFi) call.

9. The system of claim 7, wherein the retry parameter set further includes a rate at which the slow retry time interval increases with a value of a slow retry counter, and a maximum slow retry time interval.

10. The system of claim 7, wherein the slow retry time interval increases based on at least a value of a slow retry counter up to a maximum slow retry time interval.

11. The system of claim 7, wherein the trigger condition comprises reaching a maximum number of slow retries or receiving an instruction to halt retries.

12. The system of claim 7, wherein the notification of network congestion comprises a private notify message.

13. One or more computer storage devices having computer-executable instructions stored thereon, which, upon execution by a computer, cause the computer to perform operations comprising:
attempting, by a user equipment (UE), to initiate a data session over a packet data network (PDN);
receiving, by the UE, a notification of network congestion comprising a congestion metric;
receiving, by the UE, a retry parameter set, the retry parameter set comprising a maximum number of fast retries, a fast retry time interval, and a slow retry time interval;
adjusting, by the UE, at least one parameter of the retry parameter set based on the congestion metric;
based on at least a fast retry timer and a fast retry counter, attempting, by the UE, fast retries up to the maximum number of fast retries at the fast retry time interval; and
based on at least none of the initial attempt and the fast retries initiating the data session, attempting, by the UE, slow retries at the slow retry time interval, longer than the fast retry time interval, until the data session is initiated or a trigger condition halts the slow retries.

14. The one or more computer storage devices of claim 13, wherein the data session comprises a voice over WiFi (VoWiFi) call.

15. The one or more computer storage devices of claim 13, wherein the retry parameter set further includes a rate at which the slow retry time interval increases with a value of a slow retry counter, and a maximum slow retry time interval.

16. The one or more computer storage devices of claim 13, wherein the slow retry time interval increases based on at least a value of a slow retry counter up to a maximum slow retry time interval.

17. The one or more computer storage devices of claim 13, wherein the trigger condition comprises reaching a maximum number of slow retries or receiving an instruction to halt retries.

* * * * *